United States Patent [19]

Hintergräber

[11] 3,960,034
[45] June 1, 1976

[54] FLYWHEEL WITH ANTI-CRACKING SAFEGUARD FOR PROTECTION AGAINST OVERSPEED

[75] Inventor: Maximilian Hintergräber, Dietzenbach, Germany

[73] Assignee: Kraftwerk Union Aktiengesellschaft, Mulheim (Ruhr), Germany

[22] Filed: July 16, 1974

[21] Appl. No.: 488,921

[30] Foreign Application Priority Data
July 27, 1973 Germany............................ 2338265
Feb. 6, 1974 Germany............................ 2405723

[52] U.S. Cl.................................. 74/609; 74/572; 188/71.1; 188/187; 192/16; 403/410; 416/169 R
[51] Int. Cl.² ........................................... F16P 1/02
[58] Field of Search................... 74/608, 609, 572; 188/71.1, 187, 185; 416/169; 192/16; 403/410

[56] References Cited
UNITED STATES PATENTS
3,662,619   5/1972   Seeliger ............................ 74/572
3,844,387   10/1974   Morokoshi........................ 188/187

Primary Examiner—Benjamin W. Wyche
Assistant Examiner—F. D. Shoemaker
Attorney, Agent, or Firm—Herbert L. Lerner

[57] ABSTRACT

Flywheel assembly with anti-cracking safeguard for protection against overspeed, including a frustroconical shaft portion, a flywheel mounted in press-fitting engagement on the shaft portion and having a force applied thereto directed toward the end of the frustroconical shaft portion having the smaller diameter, and a catching and centering device for the flywheel located adjacent the flywheel.

10 Claims, 11 Drawing Figures

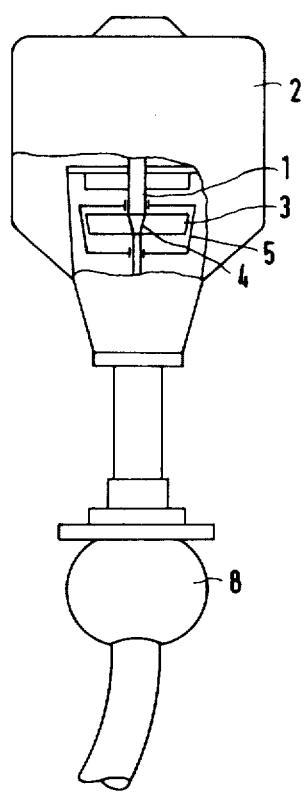
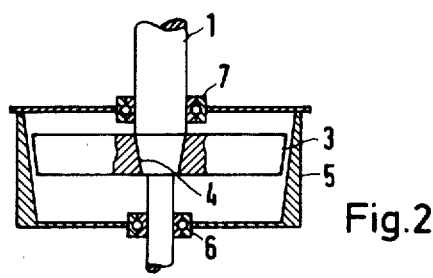
Fig.1
Fig.2

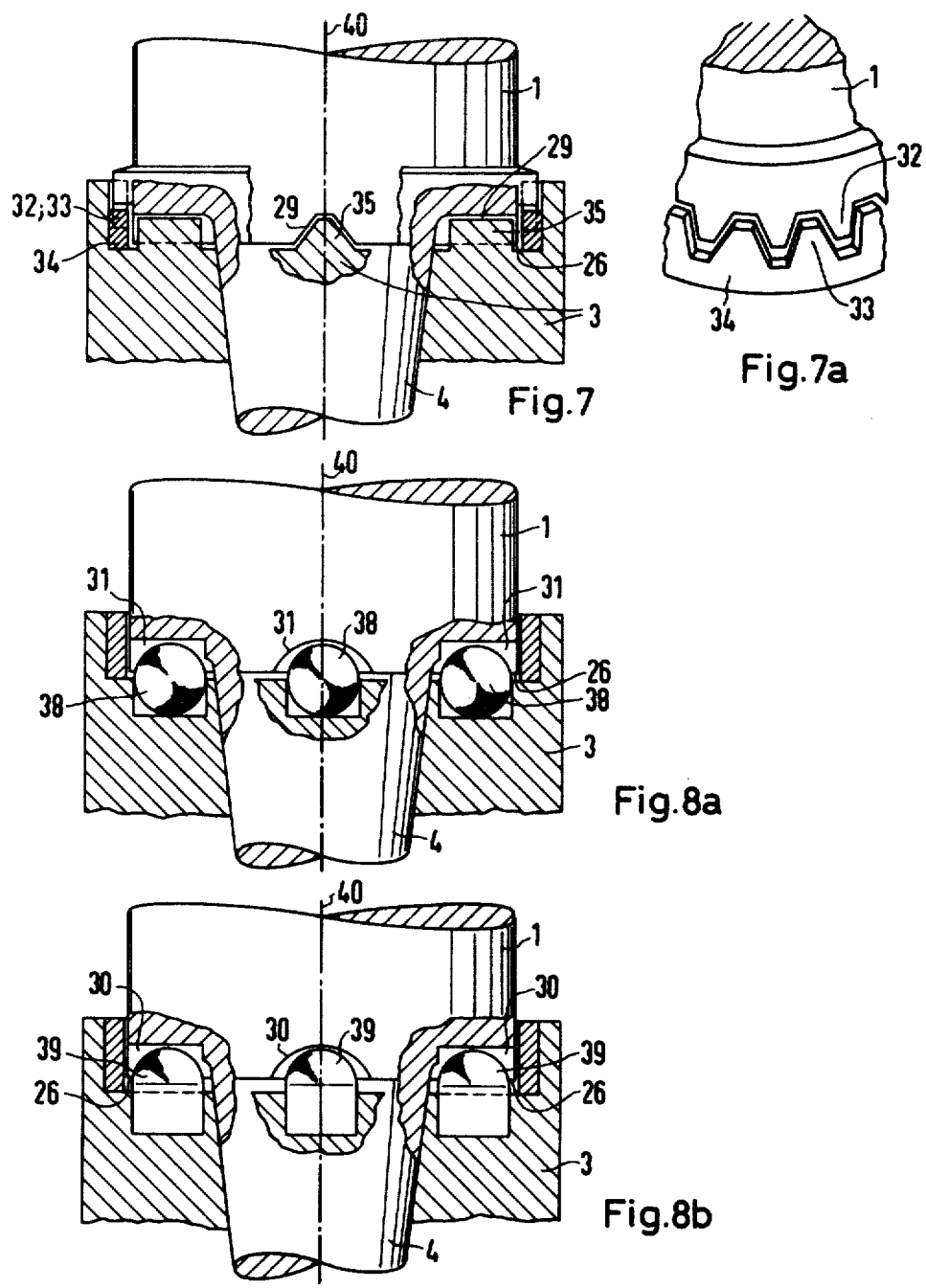

FLYWHEEL WITH ANTI-CRACKING SAFEGUARD FOR PROTECTION AGAINST OVERSPEED

The invention relates to flywheels having an anti-cracking safeguard for protection against overspeed.

Pump drive systems are furnished with flywheels, in many cases. In nuclear reactor installations, especially, assurance must be provided, in the event of an accident, that the flywheel will not crack or shatter even at higher rotary speeds than those occurring during normal operation and thereby cause destruction to the surroundings.

It is accordingly an object of the invention to provide such a flywheel assembly with an anti-cracking or shattering safeguard which will itself not be destroyed if overspeed of the shaft, on which the flywheel is mounted, occurs, and will thereby not cause any disturbances or destruction in the surroundings.

In the case where, in the event of an accident, safety devices protecting against the occurrence of overspeed in a machine set provided with a flywheel, should fail or break down or should take too long to become effective, the flywheel will be the first to be destroyed due to the centrifugal forces that occur. Because of the relatively large mass of the flywheel, considerable damage can therefore occur to the surroundings.

With the foregoing and other objects in view, therefore, there is provided in accordance the invention, a flywheel assembly with anti-cracking safeguard for protection against overspeed, comprising a frusto-conical shaft portion, a flywheel mounted in press-fitting engagement on the shaft portion and having a force applied thereto directed toward the end of the frusto-conical shaft portion having the smaller diameter, and a catching and centering device for the flywheel located adjacent the flywheel.

In accordance with another feature of the invention, the frusto-conical shaft portion is substantially vertically disposed, the end thereof of smaller diameter being located below the other end thereof, the force applied to the flywheel being the force of its own weight.

In accordance with a further feature of the invention, there is provided an outer pot-shaped container surrounding the flywheel and having a bottom, and a centering pot also surrounding the flywheel and engageable with the bottom of the outer pot-shaped container.

In accordance with an additional feature of the invention, the catching and centering device is rotatably mounted around the flywheel.

In accordance with an added feature of the invention, there is provided a spring-mounted slide plate, the catching and centering device being disposed on the slide plate.

In accordance with yet another feature of the invention, the flywheel is releasable from the press-fitting engagement thereof with the frusto-conical shaft protion, the catching and centering device having conical engagement surfaces that are engageable with the outside of the flywheel when the flywheel is released from the press-fitting engagement thereof with the shaft portion, the conical engagement surfaces being formed with grooves.

In accordance with a concomitant feature of the invention, the frusto-conical shaft portion is part of a driven shaft, and the catching and centering device comprises centering means connected to the flywheel and bearing on the driven shaft, and catching means disposed in the direction of the force applied to the flywheel and located in vicinity of the centering means.

In accordance with another feature of the invention, the frusto-conical shaft portion has an end of larger diameter than the other end thereof, another shaft portion contiguous with the end of larger diameter and being formed with recesses, means coupled with the flywheel and projecting into the recesses so as to form a form-locking connection in tangential direction of the flywheel, the means projecting into the recesses being disposed axially displaceably therein.

In accordance with a further feature of the invention, the other shaft portion contiguous with the larger-diameter end of the frusto-conical shaft portion is larger in diameter than the largest diameter of the frusto-conical shaft portion, the recesses being formed in the other shaft portion extending in axial direction.

In accordance with yet another feature of the invention the means coupled with the flywheel and projecting into the recesses formed in the other shaft portion comprise a plurality of form bodies received in hollow openings defined by the recesses formed in the other shaft portion and by corresponding recesses formed in the flywheel and disposed adjoining and in registry with the respective recesses formed in the other shaft portion.

Other features which are considered as characteristic for the invention are set forth in the appended claims.

Although the invention is illustrated and described herein as embodied in flywheel with anti-cracking safeguard for protection against overspeed, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of the specific embodiments when read in connection with the accompanying drawings, in which:

FIG. 1 is a longitudinal view, partly broken away, of a motor having an embodiment of a flywheel constructed in accordance with the invention;

FIG. 2 is an enlarged fragmentary sectional view of FIG. 1 showing the flywheel thereof;

FIGS. 6a, 6b, 7, 8a and 8b are enlarged fragmentary views of FIG. 5 showing different modifications thereof, and FIG. 7a is, furthermore, a fragmentary perspective view of FIG. 7.

Figure 3:
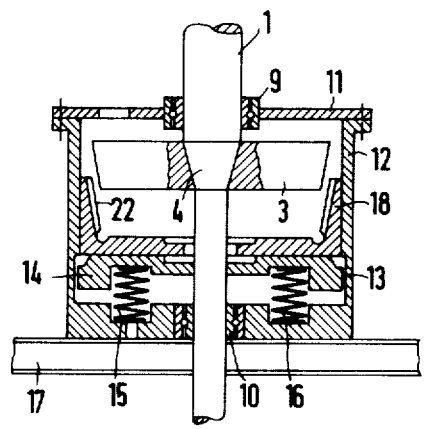
FIG. 3 is a view similar to FIG. 2 of another embodiment of the invention.

Referring now to the drawing and, first, particularly to FIGS. 1 and 2, there is shown therein a shaft 1 of a motor 2, a flywheel 3 having been shrink-fitted on the shaft 1. The flywheel 3 is mounted on a frusto-conical shaft portion 4. The flywheel 3 is surrounded by a pot-shaped catching and centering device 5, which is mounted, in turn, through bearings 6 and 7 on the shaft 1. The shaft 1 is vertically disposed and is connected below the flywheel 3 to unillustrated rotary drive component of a pump 8, for example.

The flywheel 3 is formed with an opening corresponding to the frusto-conical shaft portion 4, the opening being of such dimensions that, after the flywheel 3 has been press-fitted on the shaft portion 4, it becomes loosened at a rotary speed of the shaft 1 which is above the nominal rotary speed but below the permissible rotary speed for the flywheel 3. On the vertically disposed shaft 1, that end of the frusto-conical shaft portion 4 having the smaller diameter is located below the end thereof having the larger diameter. A force having a magnitude corresponding to the weight of the flywheel 3 is exerted on the flywheel 3 in direction toward that end of the frusto-conical shaft portion 4 having the smaller diameter. When the effective compressive forces due to the press-fitting of the flywheel 3 on the frusto-concial shaft portion 4 has approached zero value at high rotary speeds because of the effective centrifugal forces, the flywheel 3 falls downwardly due to its own weight, and is retained in the pot-shaped centering device 5. The flywheel 3 then abuts the inner peripheral surface of the centering device 5 so that this catching and centering device 5, which is mounted on the shaft 1, is accelerated due to frictional engagement with the flywheel 3 and rotates together with the flywheel 3, independently of the shaft 1, until the kinetic energy stored in the flywheel 3 is absorbed or consumed by the frictional losses, and the flywheel 3 comes to a standstill.

In the cross-sectional view of another embodiment of the catching and centering device shown in FIG. 3, the shaft 1 is mounted in bearings 9 and 10. The bearing 9 is connected to a cover 11 for an outer pot-shaped container 12. The outer pot 12 is provided at the underside thereof with a guide groove 13 wherein a slide plate 14 is guided. The slide plate 14 engages the bottom of the outer pot 12 through springs 15, the outer pot 12, in turn, being connected to the motor frame structure 17. A centering pot 18 is disposed on the slide plate 14 and is formed with an inner wall surface tapering or narrowing conically downwardly as viewed in FIG. 3. The peripheral surface of the flywheel 3 is also of conical construction and matches the conical contact surface of the centering pot 18.

With the embodiment shown in FIG. 3, the springs 15 cushion the impact produced by the downwardly falling flywheel 3. The flywheel 3 rotates with the centering pot 18 on the slide plate 14. The centering pot 18 moreover rubs against the inner wall surface of the outer pot 12 until the flywheel 3 and the centering pot 18 come to a standstill. The inner surface of the centering pot 18 is provided with grooves 22 for conducting air away.

Figure 4:
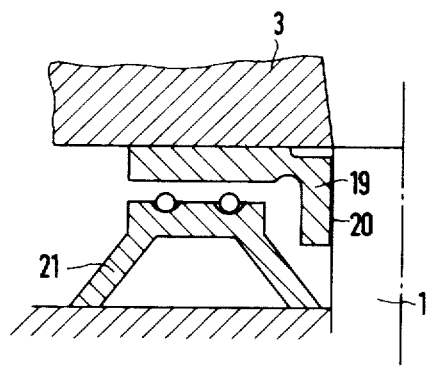
FIG. 4 is an enlarged fragmentary view of FIG. 3 showing a modification thereof.

Another possibility for centering the flywheel 3 after the release thereof from the conical shaft portion 4 is shown in FIG. 4. In the latter figure a centering device 19 is shown connected to the flywheel 3, and engages the shaft 1 through a bearing 20. A console 21 is provided below both the centering device 19 and the flywheel 3, the latter becoming seated on the console 21 after being released from the shaft 1. Since the console 21 is stationary, frictional forces develop between the centering device 19 and the console 21, depending upon the weight of the flywheel 3, the thus developed frictional forces having a braking effect upon the flywheel 3 until the latter comes to a standstill.

In the case where the shaft 1 is horizontally disposed, the flywheel weight is no longer able to be used for exerting a force on the flywheel in direction toward the end of the frusto-conical shaft portion 4 having the smaller diameter. In this case, suitable spring devices, weights at reversing rollers or the like must be provided in order to move the flywheel 3 in axial direction when the overspeed drops and, thereby, to release the connection between the frusto-conical shaft portion 4 and the flywheel 3.

Figure 5:
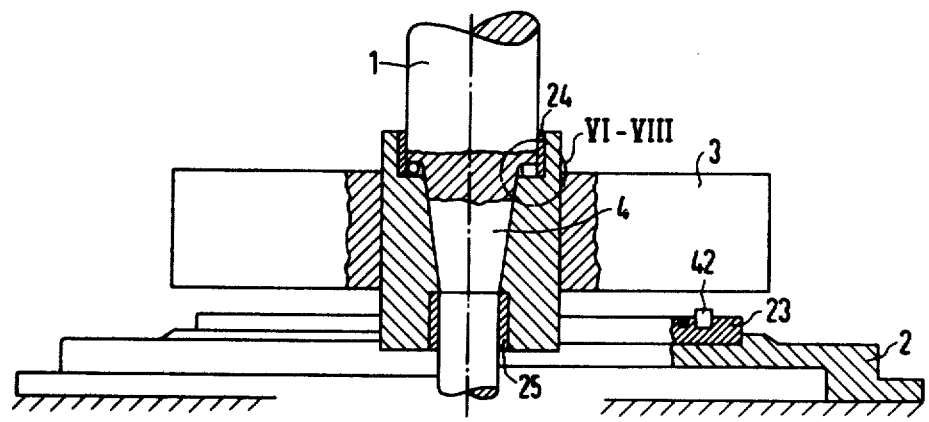
FIG. 5 is a longitudinal view, partly in section, of another embodiment of the invention.

In the embodiment of FIG. 5, the shaft 1 of a motor 2 is provided with a flywheel 3. The flywheel 3 is press-fitted on a frusto-conical shaft portion 4. A bearing plate 23 having a circular cross section is disposed on the housing of the motor 2 below the flywheel 3 coaxially to the shaft 1. Slide or shaft bearings may be provided on the surface of the bearing plate 23 facing toward the flywheel 3. Readily plastically-deformable cushioning or absorption members 42 are located on the bearing plate 23. The cushioning members 42 are formed, for example, of aluminum, and serve to moderate or mitigate the impact forces acting upon the bearing plate 23 when the flywheel 3 drops downwardly, and then serve also as slide members.

When a specific rotary speed is exceeded, the flywheel 3 widens or expands to such an extent due to effective centrifugal forces that the press-fit connection thereof to the shaft 1 is loosened or released. The weight proper of the flywheel 3 then acts to cause the flywheel 3 to drop downwardly so as to engage the bearing plate 23 and, due to frictional forces and the then failing drive, to be slowly braked. Bearings 24 and 25 located between the shaft 1 and the flywheel 3 effect guidance of the flywheel 3 on the shaft 1 even after the press-fit connection of the flywheel 3 to the frusto-conical shaft portion 4 has been loosened or released. So that the press-fit connection can be dimensioned only with regard to the desired uncoupling speed between the flywheel 3 and the shaft 1, without any regard to the forces acting between the flywheel 3 and the shaft 1 during acceleration and braking of the shaft 1, a form-locking connection is provided between the shaft 1 and the flywheel 3 in the region II—IV defined by the associated circle in FIG. 5. Embodiments of the invention showing different types of this form-locking connection are presented in FIGS. 6a, 6b, 7, 7a, 8a and 8b in detail.

Figure 6A:
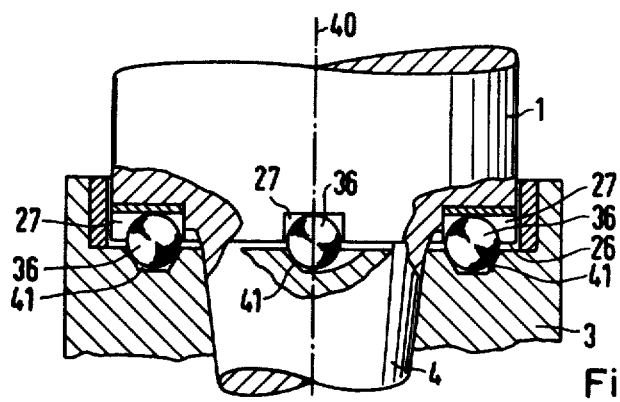
Figure 6B:
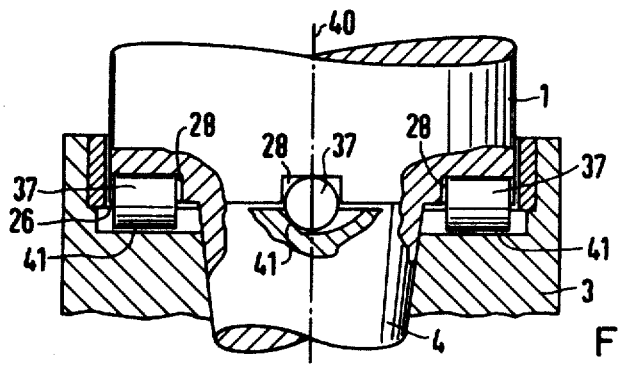

The part of the shaft 1 located above the frusto-conical shaft portion 4 has a larger diameter than that of the frusto-conical shaft portion 4. Consequently an end 26 is formed, as shown in FIG. 6a, for example. Recesses 27 to 31 (FIGS. 6a, 6b, 7, 8b, and 8a, respectively,) are machined in the end 26. Moreover, recesses 32 (FIG. 7a) are provided at the periphery of the shaft 1 above the frusto-conical shaft protion 4. The recesses 32 form a toothed crown which surrounds the shaft 1, projections 33 which are formed on a ring 34 that is connected to the flywheel 3 being in meshing engagement in the recesses 32 of the toothed crown.

A connection of the gear or toothed-wheel type is also formed between recesses 29 shown in FIG. 7 and projections 35 which extend into the recesses 29 in the embodiment of FIG. 7.

The essential feature in all of these form-locking devices is that a form-locking connection acting in tangential direction is formed between the shaft portion 1 and the flywheel 3. Form bodies project into the recesses 27, 28, 30 and 31. These form bodies are, for example, balls 36, rollers 37, balls 38 or partly spherical insert members 39 (FIG. 8a).

The form bodies respectively produce the connection between the shaft 1 and the flywheel 3 since they are disposed in an opening formed by mutually adjoining recesses.

If the form-locking connection is formed of projections and recesses which are machined in the respective ends of the shaft 1 and the flywheel 3, and if the contact surfaces are not disposed parallel to the axis 40 of the shaft 1, as is true, for example, for the contact surfaces 41 between the ball 36 and the flywheel 3, there is consequently produced, for a large torque between the flywheel 3 and the shaft 1, an additional force acting on the flywheel 3 in axial direction. This force reinforces the force of gravity acting on the flywheel 3 and results in a reduction in the uncoupling speed depending upon the size of the driving moment acting upon the flywheel 3. The inclination of this contact surface can be of varied selection for different moment directions between the flywheel 3 and the shaft 1. What is realizable therefrom is that with a moment reducing the rotary speed, the effect of the reduction of the uncoupling speed does not come about in dependence upon the moment.

I claim:

1. Flywheel assembly with anti-cracking safeguard for protection against overspeed, comprising a frusto-conical shaft portion, a flywheel mounted in a press-fitting engagement on said shaft portion and having a force applied thereto directed toward the end of the frusto-conical shaft portion having the smaller diameter, and a catching and centering device for said flywheel located adjacent said flywheel.

2. The flywheel assembly according to claim 1 wherein said frusto-conical shaft portion is substantially vertically disposed, said end thereof of smaller diameter being located below the other end thereof, said force applied to said flywheel being the force of it own weight.

3. Flywheel assembly according to claim 1 including an outer pot-shaped container surrounding said flywheel and having a bottom, and a centering pot also surrounding said flywheel and supported on the bottom of said outer pot-shaped container.

4. Flywheel assembly according to claim 1 wherein said catching and centering device is rotatably mounted around said flywheel.

5. Flywheel assembly according to claim 4 including a springmounted slide plate, said catching and centering device being disposed on said slide plate.

6. Flywheel assembly according to claim 4 wherein said flywheel is releasable from the press-fitting engagement thereof with said frusto-conical shaft portion, said catching and centering device having conical engagement surfaces that are engageable with the outside of said flywheel when said flywheel is released from said press-fitting engagement thereof with said shaft portion, said conical engagement surfaces being formed with grooves.

7. Flywheel assembly according to claim 1, wherein said frusto-conical shaft portion is part of a driven shaft, and said catching and centering device comprises centering means connected to said flywheel and bearing on said driven shaft, and catching means disposed in the direction of the force applied to the flywheel and located in vicinity of said centering means.

8. Flywheel assembly according to claim 1, wherein said frusto-conical shaft portion has an end of larger diameter than the other end thereof, another shaft portion contiguous with said end of larger diameter and being formed with recesses, means coupled with said flywheel and projecting into said recesses so as to form a formlocking connection in tangential direction of said flywheel, said means projecting into said recesses being disposed axially displaceably therein.

9. Flywheel assembly according to claim 8 wherein said other shaft portion contiguous with the larger-diameter end of said frusto-conical shaft portion is larger in diameter than the largest diameter of said frusto-conical shaft portion, said recesses being formed in said other shaft portion extending in axial direction.

10. Flywheel assembly according to claim 8 wherein said means coupled with said flywheel and projecting into said recesses formed in said other shaft portion comprise a plurality of form bodies received in hollow openings defined by said recesses formed in said other shaft portion and by corresponding recesses formed in said flywheel and disposed adjoining and in registry with the respective recesses formed in said other shaft portion.

* * * * *